Dec. 8, 1936.  C. S. COMSTOCK  2,063,585
TOWEL ROD
Filed March 10, 1936
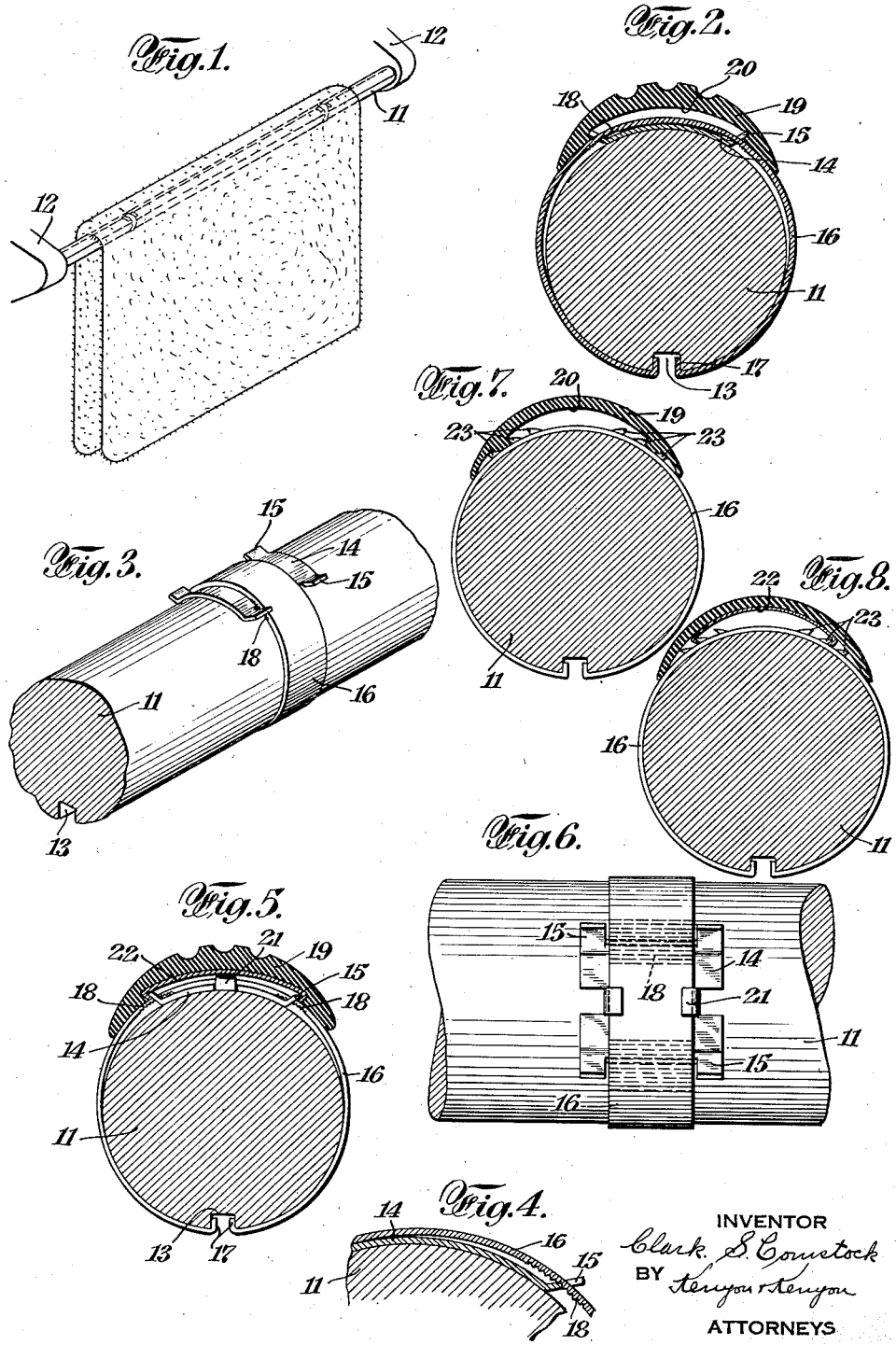
INVENTOR
Clark S. Comstock
BY Kenyon & Kenyon
ATTORNEYS Patented Dec. 8, 1936

2,063,585

UNITED STATES PATENT OFFICE 2,063,585

TOWEL ROD

Clark S. Comstock, Great Barrington, Mass.

Application March 10, 1936, Serial No. 68,002

8 Claims. (Cl. 211—124)

This invention relates to friction devices for towel rods and the like.

An object of this invention is an efficient and inexpensive friction device which can be quickly and easily applied to a towel rod or the like and embodying a friction strip extending longitudinally of the rod in parallelism with the rod axis.

According to the invention, a friction strip of rubber or other suitable material is attached to the rod by two or more bands on which the strip is adjustably mounted. Parallelism of the friction strip with the rod axis is obtained by adjustment of the strip relative to the attachment bands.

Other objects, novel features and advantages of this invention will become apparent from the following specification and accompanying drawing, wherein:

Fig. 1 is a perspective view of a towel rack, the rod of which is equipped with a device embodying the invention;

Fig. 2 is a section substantially on the line 2—2 of Fig. 1;

Fig. 3 is a perspective view of the rod and attachment band before application of the friction strip;

Fig. 4 is an enlarged fragmentary view generally similar to Fig. 2 but with the friction strip omitted;

Fig. 5 is a view similar to Fig. 2 of a modified embodiment;

Fig. 6 is a plan view of the modification disclosed in Fig. 5 with the friction strip omitted;

Figs. 7 and 8 are secondary views of modified embodiments.

Referring now to Figs. 1 to 4 inclusive, a rod 11 is supported between brackets 12 which are fastened to a wall in the usual manner. The rod 11 preferably is composed of glass or other similar material and is provided with a longitudinal slot 13 which is made as nearly in parallelism with the rod axis as possible. It is not always possible to draw such a slot in a glass rod in absolute parallelism with the rod axis and usually there is a slight drift of the slot away from true parallelism.

At spaced intervals along the rod are provided attachment devices, such devices being at least two in number as shown in Fig. 1, although any suitable number may be used. Each attachment device consists of a saddle 14 which rests on the rod and has each side edge upturned to form flanges 15 which are centrally recessed. A band 16 overlies the saddle 14 and passes through the recesses in the flanges 15. This band has its ends upturned to form flanges 17 which fit into the slot 13 in the rod. The band 16 is provided with two series of notches 18 (Fig. 4) which impositively engage the bottom edges of the recesses in the flanges 15 to permit orientation of the saddle 14 with respect to the band 16.

A friction strip 19 of rubber or other suitable material and of generally arcuate cross-section, is provided on its under face with a groove 20. This strip lies on the rod 11 with the flanges 15 received within the groove 20 and engaging the edges thereof to hold the strip on the rod. If desired, the strip 19 may be provided with a metal insert as is shown in Fig. 5 and into which the flanges 15 project for holding the strip on the rod.

The adjustability of the saddles 14 permits compensation for any drift that may be present in the slot 13 so that the strip 19 may be arranged in true parallelism with the rod axis. The saddles 14 may be relatively oriented so that they lie in proper alinement irrespective of whether or not the ends 17 of the bands 16 are in true alinement.

In the modification disclosed in Figs. 5 and 6, the saddle 14 is permanently attached to the band 16, thus facilitating assembly thereof with the rod 11. Ears 21 are struck up from the saddle and bent over the band 16 thereby slidably connecting the saddle to the band. Furthermore, in this modification, the friction band 19 is bonded on to a metal strip 22 arranged in the groove 20 this metal strip having longitudinally depending flanges which are engaged by the saddle flanges 15. In this modification also, the saddle is adjustable to effect true parallelism of the strip 19 with the rod axis.

In the modification disclosed in Figs. 7 and 8, the saddle 14 is dispensed with and the band 16 is provided with two sets of prongs 23 symmetrically arranged. In the modification disclosed in Fig. 7, these prongs are directly engageable with the sides of a groove 20 in the strip 19 while in the modification disclosed in Fig. 8, they are engageable with the flanges of a metal strip 22 arranged in the groove 20 and bonded to the strip. By selective engagement of the prongs, the strip 19 may be properly oriented at different points throughout its length to arrange it in true parallelism with the rod axis.

I claim:

1. In combination, a rod having a longitudinal groove, a band encircling said rod and having its ends seated in said groove, a friction strip resting on said rod and extending longitudinally thereof, and means for adjustably attaching said friction strip to said band.

2. In combination, a rod having a longitudinal groove, a saddle resting on said rod, a band encircling said rod and saddle, said rod having its ends seated in said groove, a friction strip extending longitudinally of said rod, and means for attaching said strip to said saddle.

3. The combination according to claim 2 in which said saddle and band are provided with coacting means for adjustably locating the saddle relative to the band.

4. The combination according to claim 2 in which the saddle is slidably interconnected with the band and the band and saddle are provided with coacting means for adjustably locating the saddle relative to the band.

5. In combination, a rod having a longitudinal groove, a saddle resting on said rod, said saddle having recessed upturned flanges, a band encircling said rod and saddle, said band passing through said recesses and having serrations on its under face engageable with the bottom edges of said recesses, flanges on the end of said band seated in said groove, and a friction strip extending lengthwise of said rod, said friction strip having a groove receiving said saddle flanges for attaching the strip to the saddle.

6. The combination according to claim 5 in which a metal strip arranged within the friction strip is bonded thereto and has flanges engageable with the saddle flanges to attach the friction strip to the saddle.

7. In combination, a rod having a longitudinal groove, a band encircling said rod and having its ends seated in said groove, two sets of prongs extending outwardly from said band, and a friction strip resting on said rod and extending longitudinally thereof, said friction strip having a groove in which said prongs are selectively receivable for adjustably attaching said strip to said band.

8. The combination according to claim 7 in which a metal strip is arranged within the friction strip groove and is provided with flanges selectively engageable with the prongs for adjustably connecting said friction strip to said band.

CLARK S. COMSTOCK.